United States Patent
Steinmetz

(10) Patent No.: US 8,684,465 B2
(45) Date of Patent: Apr. 1, 2014

(54) LONGITUDINALLY DISPLACEABLE HEADREST

(75) Inventor: Rolf Steinmetz, Düsseldorf (DE)

(73) Assignee: Nectec Automotive S.R.O. (CZ)

( * ) Notice: Subject to any disclaimer, the term of this patent is extended or adjusted under 35 U.S.C. 154(b) by 127 days.

(21) Appl. No.: 13/238,682

(22) Filed: Sep. 21, 2011

(65) Prior Publication Data

US 2012/0080924 A1  Apr. 5, 2012

(30) Foreign Application Priority Data

Oct. 4, 2010 (DE) .......................... 10 2010 041 949
Oct. 18, 2010 (DE) .......................... 10 2010 038 250

(51) Int. Cl.
*A47C 7/36* (2006.01)

(52) U.S. Cl.
USPC ....................................... 297/391

(58) Field of Classification Search
USPC ................................. 297/391, 409
See application file for complete search history.

(56) References Cited

U.S. PATENT DOCUMENTS

| | | | | |
|---|---|---|---|---|
| 2,087,152 A | * | 7/1937 | Johnson | 297/409 |
| 7,070,205 B2 | * | 7/2006 | Becker et al. | 280/751 |
| 7,293,829 B2 | * | 11/2007 | Thiel et al. | 297/216.12 |
| 2003/0057758 A1 | * | 3/2003 | Baumann et al. | 297/391 |
| 2006/0250001 A1 | | 11/2006 | Becker et al. | |
| 2007/0246989 A1 | * | 10/2007 | Brockman | 297/391 |

FOREIGN PATENT DOCUMENTS

| | | |
|---|---|---|
| DE | 102005050971 A1 | 9/2006 |
| DE | 102009045552 A1 | 4/2010 |

* cited by examiner

*Primary Examiner* — Milton Nelson, Jr.
(74) *Attorney, Agent, or Firm* — Quarles & Brady LLP

(57) ABSTRACT

The headrest has a carrier element, which has joining means for fixing to a backrest of a motor vehicle seat and an upper base, and having a cushion part which has a supporting member and is displaceable with respect to the carrier element in a direction of displacement. The carrier element features a latching strip having several latching elements, and the supporting member has a locking means which in a locking position engages with one of the latching elements and in a release position is disengaged from the latching elements. The supporting member further forms at least one oblong hole surrounding the upper base. The supporting member also has a spring-loaded strip which extends along a lower edge of the oblong hole and abuts against the upper base and pushes the same into contact with the upper edge of the oblong hole.

14 Claims, 4 Drawing Sheets

LONGITUDINALLY DISPLACEABLE HEADREST

CROSS REFERENCE TO RELATED APPLICATION

The present application claims the benefit of German Patent Application No. 10 2010 041 949.4 filed Oct. 4, 2010, and German Patent Application No. 10 2010 038 250.7 filed Oct. 18, 2010, which are both fully incorporated herein by reference.

STATEMENT REGARDING FEDERALLY SPONSORED RESEARCH OR DEVELOPMENT

Not applicable.

FIELD OF THE INVENTION

The present invention relates to a headrest having a carrier element which has joining means for fixing to a backrest of a motor vehicle seat, and having a cushion part which has a supporting member and is displaceable with respect to the carrier element in a direction of displacement. For this purpose, the carrier element features a latching strip having several latching elements, and the cushion part has a locking means which in a locking position engages with one of the latching elements and in a release position is disengaged from the latching elements.

BACKGROUND OF THE INVENTION

Such a headrest is known from U.S. 2006/0250001 A1 and DE 10 2005 050 971 A1, respectively. In said known headrest a handle is disposed on the outer lateral left-hand and right-hand side. This handle makes it possible for the cushion part to be displaced with respect to the carrier element.

Such headrests have proven to be effective. However, the handle projecting from both sides of the cushion part necessitates appropriate passages through the cushion material and the cover of the cushion part.

As regards the further state of the art reference is made to DE 10 2009 045 552 A1.

SUMMARY OF THE INVENTION

The desired object of the invention is a rattle-free and clearance-free connection between the carrier element and the supporting member. The connection between these two components should be such that the headrest disposed in the vehicle is not only clearance-free when the vehicle is stationary but a relative movement between the carrier element and the supporting member does not occur even in different driving states.

This is where the invention comes in. It is an object of the invention to further develop the already known headrest to the extent that the supporting member and the carrier element can be moved relative to each other in a rattle-free and clearance-free manner and are accordingly connected to each other.

Departing from the headrest of the type mentioned above this object is attained by a headrest including a carrier element having an upper base and being fixable to a backrest of a motor vehicle seat. A cushion part having a supporting member is displaceable with respect to the carrier element in a direction of displacement. The carrier element includes a latching strip having several latching elements, and the supporting member has a locking means which in a locking position engages with one of the latching elements and in a release position is disengaged from the latching elements. The supporting member further forms at least one oblong hole surrounding the upper base. The supporting member has at least one of 1) a spring-loaded strip which extends along an edge of the oblong hole, abuts against the upper base and pushes the upper base into contact with the opposite edge of the oblong hole, and 2) at least one inclined region, the supporting member featuring at least one U-shaped bracket which extends beyond the inclined region and abuts without clearance against the inclined region and which has an opening, and the opening of the U-shaped bracket preferably points downwards.

In one alternative of the headrest a spring-loaded strip is provided at the supporting member. This spring-loaded strip extends along a lower edge of the oblong hole and pushes the upper base of the carrier element into contact with the upper edge of the oblong hole. In this way, the clearance-free operation is attained. This clearance-free operation is realized along the entire path which can be travelled by the upper base within the oblong hole. Hence, rattling cannot occur between the upper base and the supporting member, and the operation is clearance-free along the entire travel path. It is also possible to provide the spring-loaded strip at the upper edge of the oblong hole. It is equally possible to provide one spring-loaded strip at the lower edge and at the upper edge of the oblong hole, respectively.

In another alternative of the headrest, the object is attained by a U-shaped bracket which surrounds the inclined region without clearance and which abuts against the same. This bracket has a U-shaped base and two lateral legs. Prior to assembly, the spacing between the lateral legs is smaller than the corresponding dimensions of the carrier element which, subsequent to assembly, is disposed in the U-shaped bracket. In practical applications the bracket slides back and forth along the inclined region. The bracket is provided in particular to ensure the clearance-free operation in the y-direction. As a result of the utilized material the legs exhibit a certain degree of elasticity. The legs always abut without clearance against the carrier element. Preferably, starting from the U-shaped base, the inner sides of the legs diverge in the shape of a V, wherein the included angle is in a range between 2° and 10°. If the legs extend in a V-shape, the legs also exert a force component in the z-direction. Preferably, the direction of these force components extends opposite to the force which is exerted on the upper base by the spring-loaded strips. The legs are preferably made of a material which has elasticity and good sliding properties with respect to the carrier element which is typically made of metal. For instance, the material used for the U-shaped brackets is a plastic material, such as polyamide. It is advantageous if the U-shaped base is not in contact with the inclined region. Preferably, the U-shaped brackets extend in the longitudinal direction of the inclined region over a certain distance of for instance 2 to 10 mm. Preferably, the U-shaped brackets have a front and a rear abutment edge.

Preferably, the base of the U-shaped bracket is disposed above the inclined region when the spring-loaded strip is disposed at the lower edge of the oblong hole or, conversely, is disposed below the inclined region when the spring-loaded strip is disposed at the upper edge of the oblong hole.

In particular, the object is attained in that both alternatives, i.e. at least one spring-loaded strip and also at least one U-shaped bracket, are provided. Preferably, two U-shaped brackets and/or two spring-loaded strips are provided, which are each of identical design.

Preferably, the U-shaped brackets are disposed in the immediate vicinity of a locking means and the spacing from the locking means is preferably smaller than 10 mm, more preferably smaller than 5 mm. The carrier element is preferably integrally made of a metal. Preferably, the supporting member is made of a plastic material. In particular, the spring-loaded strip is made of a plastic material. Preferably, at least the surface of said plastic strip is designed so as to be elastic, in particular rubbery-elastic, whereby contact noises can be further minimized.

The inclined region is formed such that the desired direction of displacement is attained. The inclined region may extend essentially in the x-direction but may also partially extend in the x-direction and partially extend in the z-direction. In any case, the inclined region is disposed in the xz-plane. By means of a soft stop, which is assigned to an end of the at least one oblong hole, it is avoided that a hard stop may occur here during an adjustment movement.

Preferably, the locking means is disposed in the immediate vicinity of the U-shaped base of the U-shaped bracket. The U-shaped base does not come into contact with the sawtooth-shaped indentations. Besides, preferably a control slide is disposed in the supporting member such that it is displaceable in the y-direction.

The control slide makes it possible for the locking means to either interact or else not to interact in a controlled manner with the latching strip. The control slide has V-shaped flanks, wherein the flanks extend in the yz-plane. A component having the locking slide fastened thereto so as to be movable interacts with the flanks.

The term "forward" in the following context shall be understood to refer to a direction of movement which has at least one component acting in the x-direction. A backward movement refers to a movement being opposite hereto and which accordingly has at least one component acting in the negative x-direction. The adjusting movement of the cushion part with respect to the carrier element is frequently also effected with the aid of a component acting in the z-direction, respectively. In this process, a forward displacement of the cushion part is effected with the aid of one component acting in the x-direction and in the z-direction, respectively. The x-direction extends in the road plane and extends forward in the direction of travel. The y-direction is equally disposed in the road plane. The z-direction extends upwardly at right angles. These three directions jointly form a right-hand coordinate system.

Advantageously, the carrier element is designed with a U-shape, as is already known from the state of the art mentioned at the beginning. The carrier element has two bars. With the aid of said bars the connection with a backrest of a motor vehicle seat is produced. Typically, the bars are retained in the backrest so as to be height-adjustable. The bars each converge into respectively one inclined region, and the two inclined regions extend in the direction of displacement. The latching strip is either separately formed and connected to the inclined region or is formed in the inclined region itself. Preferably, each of the two inclined regions has a separate latching bar. However, it suffices if only one of the two inclined regions is provided with a latching strip.

The locking means is not movable with respect to the supporting member in the direction of displacement, i.e. it always moves jointly with the supporting member in the direction of displacement. The locking means can be moved with respect to the supporting member in a guide which is arranged transversely to the direction of displacement. This movement must be enabled over a sufficiently large travel path, so that the locking means can be displaced between the release position and the locking position.

In a preferred embodiment the latching elements are designed in the form of sawtooth-shaped indentations. Here, the inclined sawtooth-shaped flank is directed forward. The steep flank of the sawtooth is disposed behind the inclined flank. Said steep flank is a locking flank and offers sufficient security such that the selected position of displacement of the cushion part is maintained also in the event of an accident, if for instance a passenger's head is pushed against the cushion part. This means that a self-locking mechanism is realized. By contrast, the inclined flank is designed such that the interaction between the locking means and the latching element is not a self-locking mechanism. If the cushion part is pulled forward, the locking means slides on the respective inclined flank, then slides over an unblocked region of the latching strip and automatically reaches the latching element disposed further ahead etc. until engaging into a terminal latching element, which is the frontmost latching element and has a U shape instead of the sawtooth-shape.

A separate handle is not necessitated. The cushion part hereby can be brought into different positions with respect to the carrier element such that it is moved with respect to the carrier element. In this context, use is made of the aspect that the cushion part in an accident needs to be locked such that it cannot be moved backwards. The movability in the forward direction, however, does not have to be restricted. The movability in the forward direction is used for effecting the adjustment. However, provision may also be made for a separate handle, by means of which the actuation is performed.

In a preferred further development provision is made for a locking spring. Said locking spring is preferably disposed between the supporting member and the locking means and pushes the locking means in the locking position.

Further advantages and characteristics of the invention are apparent from the claims and the following description of two exemplary embodiments of the invention, which shall not be construed to be restrictive to the invention. In this regard, it shall be understood that optional features, in particular also partial features of the description and/or of the subclaims, can be combined with each other and/or can be combined with the features of the main claim.

DETAILED DESCRIPTION OF THE EXAMPLE EMBODIMENTS

The exemplary embodiments are supposed to illustrate the invention as graphically as possible. Many essential parts of the headrest are not shown, since they are designed according to the state of the art.

Figure 1:
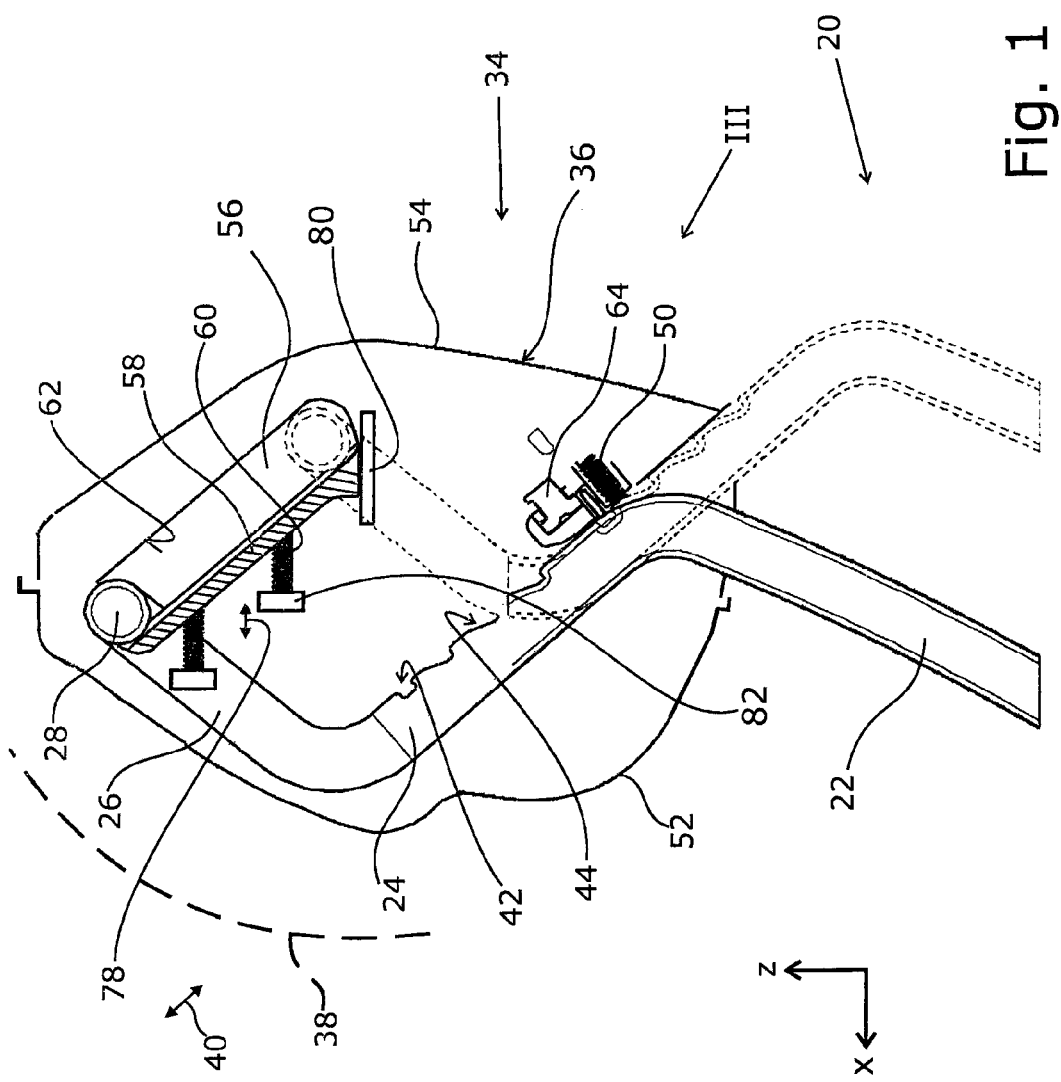
FIG. 1 shows a cross-sectional lateral view in the y-direction of a headrest, wherein the cushion part is engaged in the frontmost latching element, and the position of the carrier element in the rearmost latching element is illustrated with broken lines.
Figure 2:
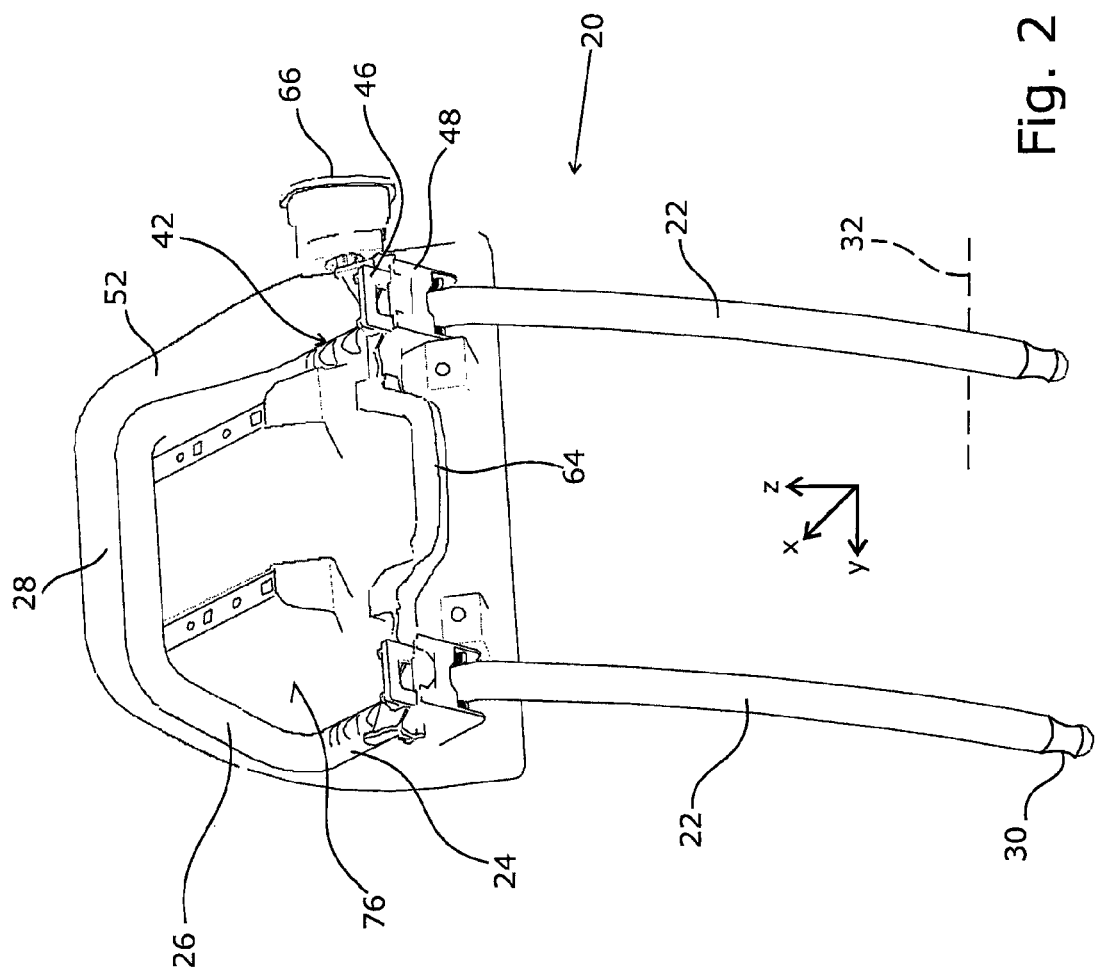
FIG. 2 shows a perspective view of the arrangement according to FIG. 1, but without a rear shell of the supporting member of the cushion part.
Figure 3:
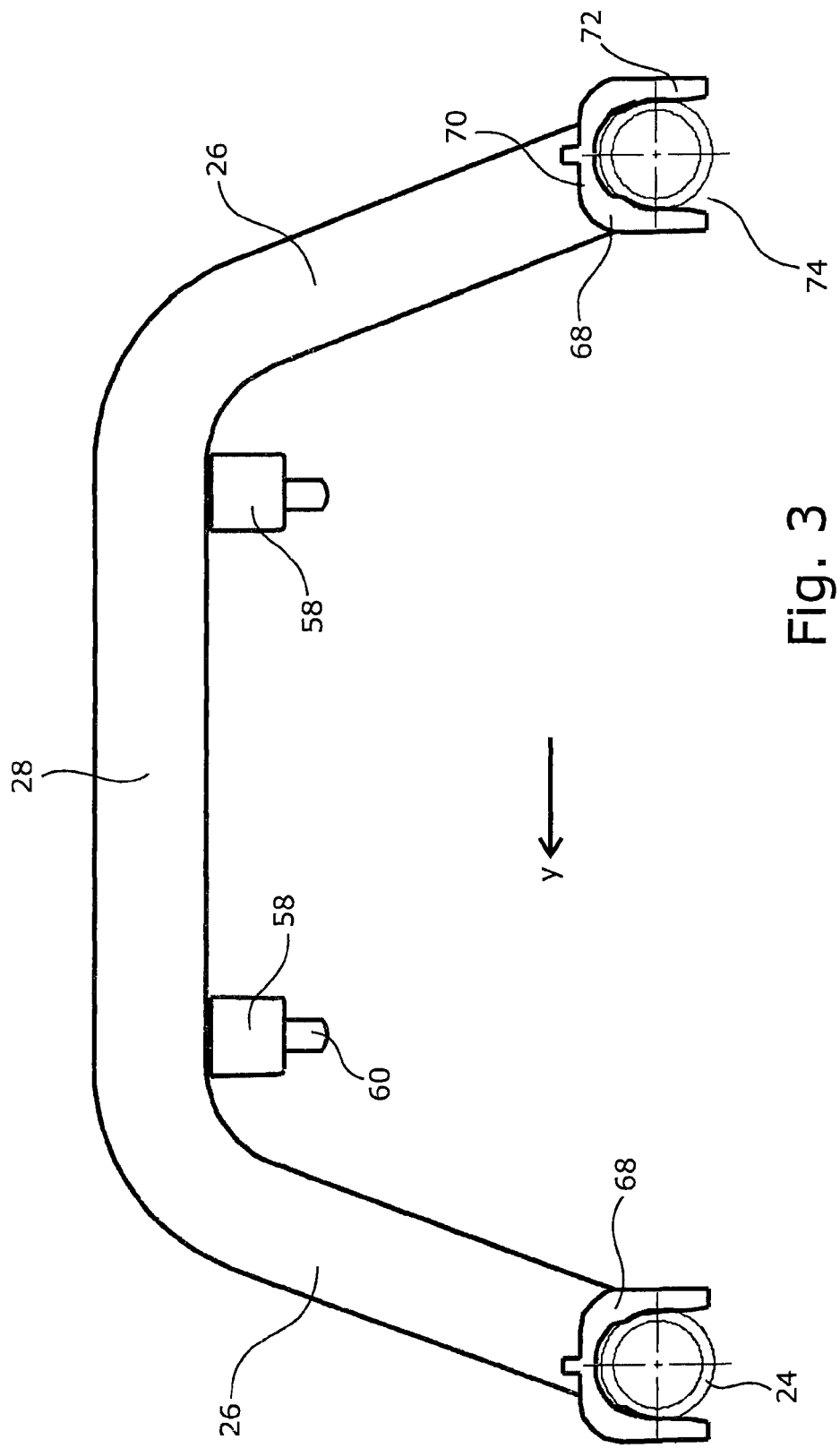
FIG. 3 shows a view of the carrier element according to arrow III in FIG. 1 with the spring-loaded strips and the U-shaped brackets.

Firstly, the first exemplary embodiment according to FIGS. 1 to 3 will be discussed. The illustrated headrest has a carrier element 20 which is designed in the same way as in the state of the art cited in the introduction. The carrier element integrally forms two parallel bars 22. Each bar 22 is upwardly adjoined by an inclined region 24, which extends rectilinearly to the bar 22 and at an angle of approximately 115°. The bars 22 and the inclined regions 24 extend substantially in the xy-plane. Each inclined region 24 is upwardly adjoined by a lateral region 26, which extends approximately in the same direction as the corresponding bar 22. However, the two lateral regions are inclined towards each other to a certain degree, such that their extension forms an intersection which is disposed above the lateral regions 26. The two lateral regions 26 are connected to each other by means of an upper base 28 which extends in the y-direction.

At least one bar 22 has joining means 30 for fixing the headrest at a backrest 32 of a motor vehicle seat which is not shown here in greater detail. The joining means 30 are designed according to the state of the art.

The headrest is composed of the carrier element 20 and a cushion part 34. Of the cushion part 34 essentially the supporting structure, namely a supporting member 36, is shown in the figures. A cushion body 38 of the cushion part 34 is partially indicated and designed according to the state of the art.

The cushion part 34 is displaceable with respect to the carrier element 20 along a direction of displacement 40. Said direction of displacement 40 extends in parallel to the inclined regions 24 which extend in parallel to each other.

The carrier element 20 has a latching strip 42 which is formed in the inclined region 24 in each case. The latching strip has four latching elements 44 which are formed on the upper side of the inclined region 24. Three of these latching elements are designed with a sawtooth shape and each of them has a rear flank which extends substantially rectangularly to the direction of displacement 40, and each of them has a front flank which extends at a flat angle of for instance 20° to the direction of displacement. The frontmost latching element is rectangular in shape. Between the latching elements unblocked regions are disposed, which are of approximately the same size as the sawtooth-shaped latching elements. The latching strip 42 extends over approximately 80% plus or minus 20% of the overall length of the inclined region 24.

At the cushion part 34 a locking means 46 is guided so as to be displaceable. For this purpose, a guide 48 is formed at the supporting member 36, which is only partially indicated in the drawing and is designed according to the state of the art. Said guide makes it possible for the locking means 46 to be rectangularly displaceable in the direction of displacement 40 with respect to the supporting member 36. The locking means 46 moves jointly with the cushion part 34 in the direction of displacement 40. The locking means 46 is elastically pre-stressed into engagement with the latching elements 44 by means of at least one locking spring 50. The locking spring 50 at its upper end is retained and fixed at an abutment which is connected to the supporting member 36.

The total distance which may be travelled by the cushion part 34 with respect to the carrier element 20 in the direction of displacement 40 is limited in both directions by end stops. These end stops are preferably assigned dampers or elastic means, for instance foam cushions, which acoustically dampen the respective end stop.

The supporting member 36 is essentially formed of two shells, namely a front shell 52 and a rear shell 54. Both shells jointly limit two oblong holes 56 which are of identical design. The clear length of said oblong holes corresponds to the displacement path plus the diameter of the base 28. The spacing of the oblong holes 56 in the y-direction is between 5 cm and 10 cm. The front shell 52 respectively forms one lower edge of said two oblong holes, and the upper edge is limited by the rear shell 54. The front shell 52 also has lateral surfaces against which the edges of the lateral regions 26 come into abutment.

The front shell 52 has two spring-loaded strips 58 which are arranged in guides so as to be displaceable. The spring-loaded strips 58 each form the lower edge of the respective oblong hole 56 and are driven into an uppermost position by means of springs 60 and push the base 28 into abutment against an upper edge 62 of the respective oblong hole 56. In the illustrated exemplary embodiment, the direction of displacement of the spring-loaded strip 58 essentially extends in the x-direction and at an angle of approximately 45° to the lower edge of the oblong hole 56. For this purpose, the spring-loaded strips 58 at one end have a chamfered edge which interacts with an incline 80. Said incline 80 is a component which is formed by the rear shell 54. Said incline 80 extends in parallel to an arrow 78 which indicates the direction of displacement of the spring-loaded strip 58. Each of the two springs 60 rests against an abutment 82 which is formed by the supporting member 36. This angle may be in the range of 20° to 70°. The spring-loaded strips 58 in the y-direction have a width of approximately 5 mm to 10 mm, for instance 8 mm, and with two edge-sided projections abut against the base 28 at approximately this distance. The spring-loaded strips 58 extend rectilinearly.

Between the two shells 52, 54 a slider 64 is supported, which is displaceable in the y-direction. To enable the movement of displacement provision is made for a handle 66. The slider 64 has control surfaces for the movement of the locking means 46. The two guides 48 interact with the slider 64. Said guides 48 are equally fixed between the two shells 52, 54 and are inserted into an assembly guide of the front shell 52.

In the exemplary embodiment, U-shaped brackets 68 are provided in the immediate vicinity of said guides and are integrally connected to said guides 48. Again such a bracket 68 is formed for each inclined region 24. Said bracket has a U-shaped base 70 and two lateral legs 72. Said legs have a spacing from one another which is smaller than the corresponding spacing of the inclined region 24, in the exemplary embodiment this means smaller than the diameter. The lateral legs elastically abut against the inclined region 24. The U-shaped bracket 68 has an opening 74 which lies opposite to the U-shaped base 70. By means of this opening 74 the inclined regions 24 are inserted. The opening 74 points downwards. The two U-shaped brackets 68 fix the carrier element 20 essentially in the y-direction and also cause a force component to act in the negative z-direction. The spring-loaded strips 58 push the carrier element 20 essentially in the z-direction. As a result, a clearance-free and rattle-free operation is obtained.

Guides that are formed by the supporting member 36 for the carrier element 20 make it possible to achieve an overall mechanically fixed connection between the supporting member 36 and the carrier element 20. Said guides in particular have the inclined surfaces 76 of the front shell 52, against which the inner flanks of the lateral regions 26 slidingly abut. The two inclined surfaces 76 of the front shell 52 are disposed between the lateral regions 26. By means of said two inclined surfaces 76 a movement of the supporting member 36 with respect to the carrier element 20 is blocked in the y-direction. Upon displacement of the supporting member 36 relative to the carrier element 20 the inner flanks of the lateral regions 26 slide along the inclined regions 76.

Figure 4:
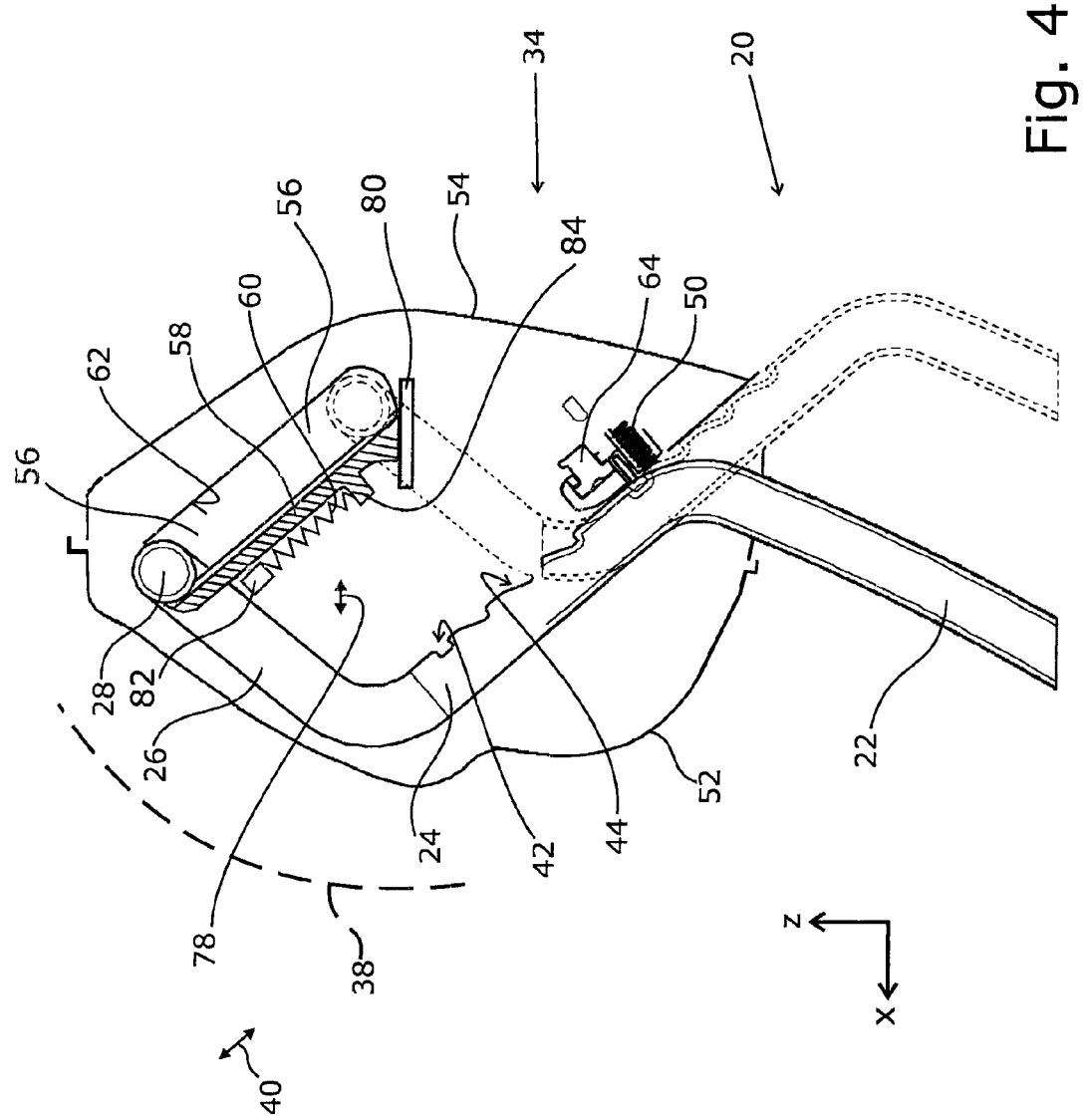
FIG. 4 shows a cross-sectional lateral view, corresponding to FIG. 1, of a second exemplary embodiment.

The exemplary embodiment according to FIG. 4 essentially conforms to the previously discussed exemplary embodiment, wherein only the differences will be explained in the following: Here the spring 60 does not extend in parallel to the arrow 78, but rather extends in parallel to the longitudinal direction of the oblong hole 56. The spring in turn is configured as a helical compression spring and rests against the abutment 82 and a nose 84 which forms the spring-loaded strip 52. The abutment 82 is disposed in the immediate vicinity of the spring-loaded strip 58 and in turn forms a part of the supporting member. In one alternative, a torsion spring is used, which is disposed for instance between the nose 84 and the incline 80.

The invention claimed is:

1. A headrest comprising:
 a carrier element having an upper base and being fixable to a backrest of a motor vehicle seat; and
 a cushion part having a supporting member and being displaceable with respect to the carrier element in a direction of displacement, wherein the carrier element includes a latching strip having several latching elements, and the supporting member having a locking means which in a locking position engages with one of the latching elements and in a release position is disengaged from the latching elements, and the supporting member further forms at least one oblong hole surrounding the upper base, and the supporting member has at least one of
 at least one spring-loaded strip which extends along an edge of the at least one oblong hole, abuts against the upper base and pushes the upper base into contact with an opposite edge of the at least one oblong hole, and
 at least one inclined region, the supporting member features at least one U-shaped bracket which extends beyond the inclined region and abuts without clearance against the at least one inclined region.

2. The headrest according to claim 1, in which the carrier element integrally forms two parallel bars, and the at least one inclined region is two individual inclined regions, each of the individual inclined regions is upwardly adjacent to one of said two parallel bars, a lateral region is upwardly adjacent to each individual inclined region, the two lateral regions are connected to each other by means of the upper base, the upper base extends in a y-direction and the lateral regions abut against an inclined region of the supporting member.

3. The headrest according to claim 1, in which the at least one oblong hole is two substantially identical oblong holes formed in the supporting member and arranged so as to be offset in a y-direction, and each oblong hole of said two substantially identical oblong holes is assigned a spring-loaded strip.

4. The headrest according to claim 1, in which the supporting member has two components, namely a front shell and a rear shell, wherein the front shell forms one of the edges of the at least one oblong hole and the rear shell forms the other edge of the at least one oblong hole.

5. The headrest according to claim 1, in which the supporting member has a soft stop which is assigned to one end of the at least one oblong hole and which comes into contact with the upper base.

6. The headrest according to claim 1, in which the latching elements are in the at least one inclined region and in the form of sawtooth-shaped indentations, said indentations having an inclined flank in a forward direction and a steep locking flank in a backward direction.

7. The headrest according to claim 1, in which the locking means is disposed in the immediate vicinity of the U-shaped bracket and connected to the U-shaped bracket.

8. The headrest according to claim 1, in which the locking means is movably disposed at the supporting member transversely to the direction of displacement, and in the direction of displacement moves jointly with the supporting member.

9. The headrest according to claim 1, which has the at least one spring-loaded strip and the at least one U-shaped bracket, in which the at least one spring-loaded strip exerts one first force component on the bar, in particular on the upper base, the U-shaped bracket exerts a second force component on the at least one inclined region, and the first force component and the second force component substantially act in opposite direction to each other.

10. The headrest claim 1, in which the supporting member has the at least one spring-loaded strip and the at least one U-shaped bracket, the U-shaped bracket having a U-shaped base and the spring-loaded strip and the U-shaped base being disposed on mutually facing sides of the carrier element.

11. A headrest comprising:
 a carrier element having an upper base and being fixable to a backrest of a motor vehicle seat; and
 a cushion part having a supporting member and being displaceable with respect to the carrier element in a direction of displacement, wherein the carrier element includes a latching strip having several latching elements, and the supporting member having a locking means which in a locking position engages with one of the latching elements and in a release position is disengaged from the latching elements, and the supporting member further forms at least one oblong hole surrounding the upper base, and the supporting member has a spring-loaded strip which extends along an edge of the at least one oblong hole, said spring-loaded strip abuts against the upper base and pushes the upper base into contact with an opposite edge of the oblong hole.

12. The headrest according to claim 11, including at least one inclined region, the supporting member features at least one U-shaped bracket which extends beyond the at least one inclined region and abuts without clearance against the at least one inclined region.

13. A headrest comprising:
 a carrier element having an upper base and being fixable to a backrest of a motor vehicle seat; and
 a cushion part having a supporting member and being displaceable with respect to the carrier element in a direction of displacement, wherein the carrier element includes a latching strip having several latching elements, and the supporting member having a locking means which in a locking position engages with one of the latching elements and in a release position is disengaged from the latching elements, and the supporting member further forms at least one oblong hole surrounding the upper base, and the supporting member has at least one inclined region, the supporting member features at least one U-shaped bracket having two elastically deformable lateral legs extending beyond the at least one inclined region, wherein spacing between said legs prior to assembly being smaller than a corresponding spacing of the at least one inclined region, such that upon assembly said legs elastically abut without clearance against the at least one inclined region.

14. The headrest according to claim 13 including a spring-loaded strip which extends along an edge of the at least one oblong hole, and abuts against the upper base and pushes the upper base into contact with the opposite edge of the at least one oblong hole.

* * * * *